(12) United States Patent
Casella et al.

(10) Patent No.: US 7,508,318 B2
(45) Date of Patent: Mar. 24, 2009

(54) APPARATUS, SYSTEM AND METHOD FOR MONITORING, RECORDING AND BILLING FOR INDIVIDUAL FIXTURE AND UNIT WATER USAGE IN A MULTI-UNIT STRUCTURE

(75) Inventors: Michael H. Casella, Baldwin, MD (US); Keith W. Lipford, Severna Park, MD (US); Brian L. Lipford, Bel Aire, MD (US)

(73) Assignee: H20Flo, LLC, Towson, MD (US)

( * ) Notice: Subject to any disclaimer, the term of this patent is extended or adjusted under 35 U.S.C. 154(b) by 17 days.

(21) Appl. No.: 11/399,395

(22) Filed: Apr. 7, 2006

(65) Prior Publication Data
US 2006/0245467 A1    Nov. 2, 2006

Related U.S. Application Data

(60) Provisional application No. 60/771,111, filed on Feb. 8, 2006, provisional application No. 60/669,383, filed on Apr. 8, 2005.

(51) Int. Cl.
*G08B 23/00* (2006.01)

(52) U.S. Cl. ............... 340/870.02; 705/412; 73/861.77; 73/861.79

(58) Field of Classification Search ............ 340/870.02, 340/870.03, 870.07, 870.16; 73/861.77, 73/861.78, 861.28, 361.79; 705/462
See application file for complete search history.

(56) References Cited

U.S. PATENT DOCUMENTS

| | | | |
|---|---|---|---|
| 4,940,976 A | 7/1990 | Gastouniotis et al. | |
| 5,199,307 A * | 4/1993 | Onoda et al. | 73/861.78 |
| 5,659,300 A * | 8/1997 | Dresselhuys et al. | 340/870.02 |
| 5,892,158 A * | 4/1999 | Franklin et al. | 73/861.77 |
| 5,986,573 A | 11/1999 | Franklin et al. | |
| 6,012,339 A * | 1/2000 | Genack et al. | 73/861.77 |
| 6,161,100 A * | 12/2000 | Saar | 705/412 |
| 6,243,693 B1 | 6/2001 | Richards | |
| 6,351,223 B1 | 2/2002 | DeWeerd | |
| 6,647,806 B1 * | 11/2003 | Estrada et al. | 73/861.28 |
| 2003/0088527 A1 | 5/2003 | Hung et al. | |

(Continued)

OTHER PUBLICATIONS

Wellspring—Water & Utility Submetering for All Building Types, p. 1, Mar. 31, 2005, http://www.wellspringwireless.com/.

(Continued)

*Primary Examiner*—Albert K Wong
(74) *Attorney, Agent, or Firm*—Miles & Stockbridge P.C.; David R. Schaffer, Esq.

(57) ABSTRACT

An apparatus including means for measuring and storing flow information for a fluid flowing through each of a plurality of fixtures in a single unit in a multi-unit structure, and each means for measuring and storing operates independently of all other means for measuring and storing and means for generating and storing power from the fluid flowing through each of the plurality of fixtures. The apparatus also may include means for transmitting in a wireless transmission the flow information with a unique identifier associated with each of the plurality of fixtures having sufficient stored power to transmit the flow information and means for accumulating the flow information in a storage area for each of the plurality of fixtures with insufficient stored power to transmit the flow information.

38 Claims, 9 Drawing Sheets

U.S. PATENT DOCUMENTS

2004/0073524 A1    4/2004    Smith et al.

OTHER PUBLICATIONS

Wellspring—Water & Utility Submetering for All Building Types, Products: Innovative Solutions, pp. 1-3, Mar. 31, 2005, http://www.wellspringwireless.com/products.html.

Wellspring—Water & Utility Submetering for All Building Types, Aqura Technology, pp. 1-3, Mar. 31, 2005, http://www.wellspringwireless.com/aqura.html.

Wellspring Wireless Utility Services Aqura Submetering Products, Aqura Energy Monitor, pp. 1-2, 2005.

Wellspring Wireless Utility Services Aqura Submetering Products, Aqura Water Submeter, pp. 1-2, 2005.

TOTO EcoPower Faucets, pp. 1-2, Apr. 7, 2005, http://www.totousa.com/toto/pagecontentview.asp?pageid=54&showimage=eco.

TOTO EcoPower Faucets, Engineered for the Environment, p. 1, Apr. 7, 2005, http://www.totousa.com/toto/pagecontentview.asp?pageid=55&showimage=eco.

TOTO EcoPower Faucets, Faucet Features, pp. 1-2, Apr. 7, 2005, http://www.totousa.com/toto/pagecontentview.asp?pageid=56&showimage=eco.

TOTO EcoPower Faucets, Models, p. 1, Apr. 7, 2005, http://www.totousa.com/toto/pagecontentview.asp?pageid=65&showimage=eco.

International Application No. PCT/US06/13183—PCT International Search Report and Written Opinion of the International Searching Authority mailed Sep. 9, 2008.

* cited by examiner

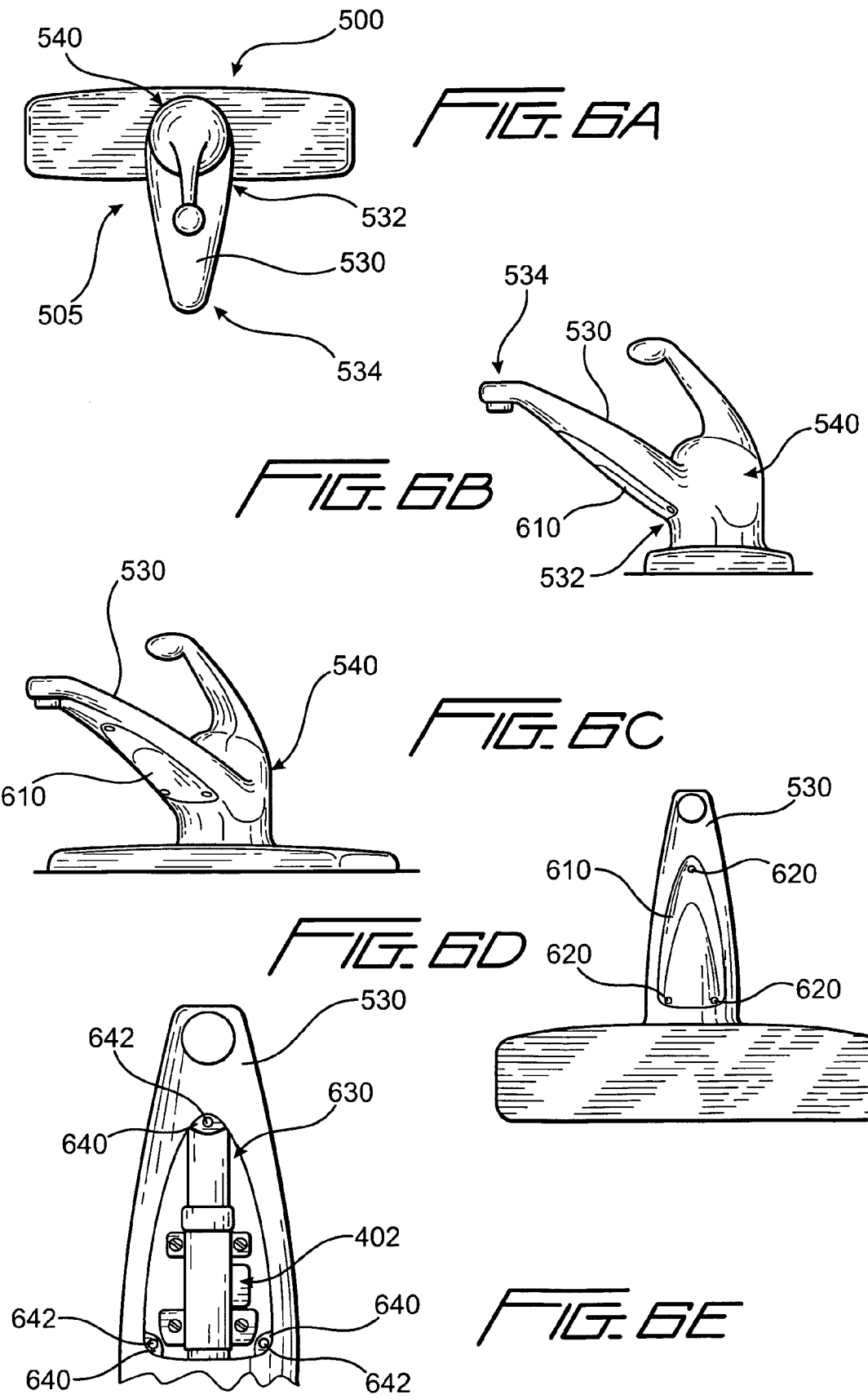

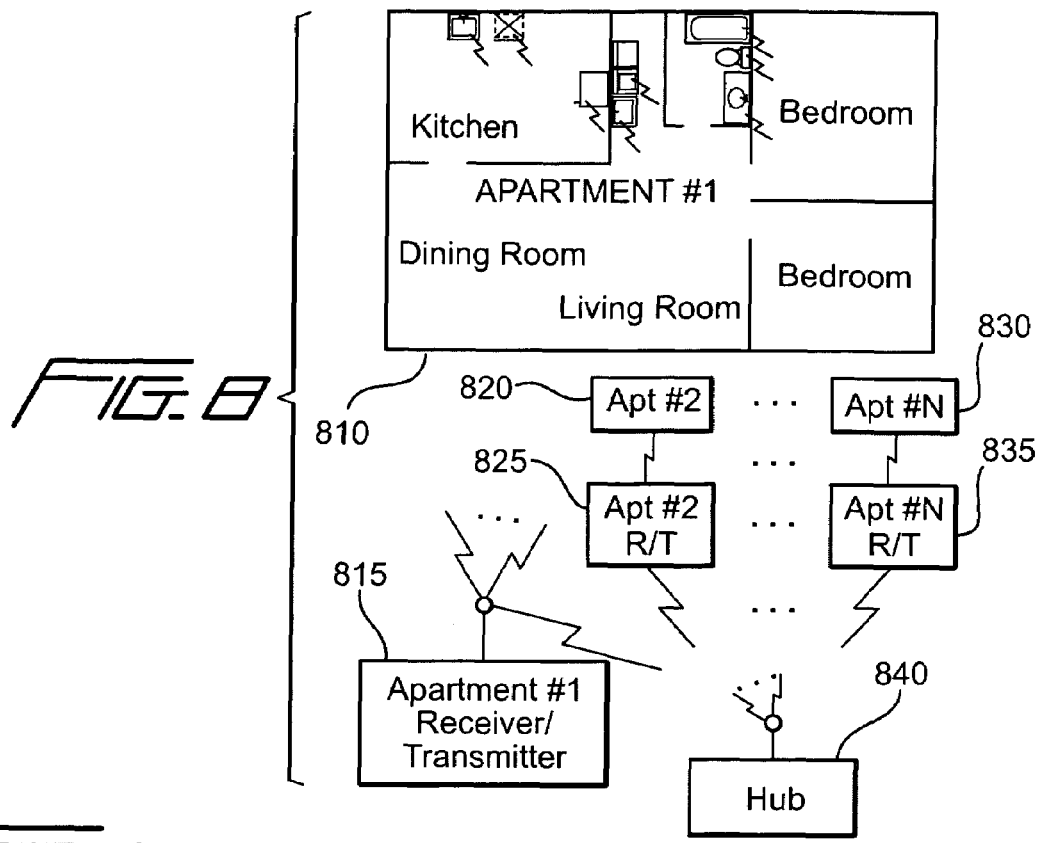
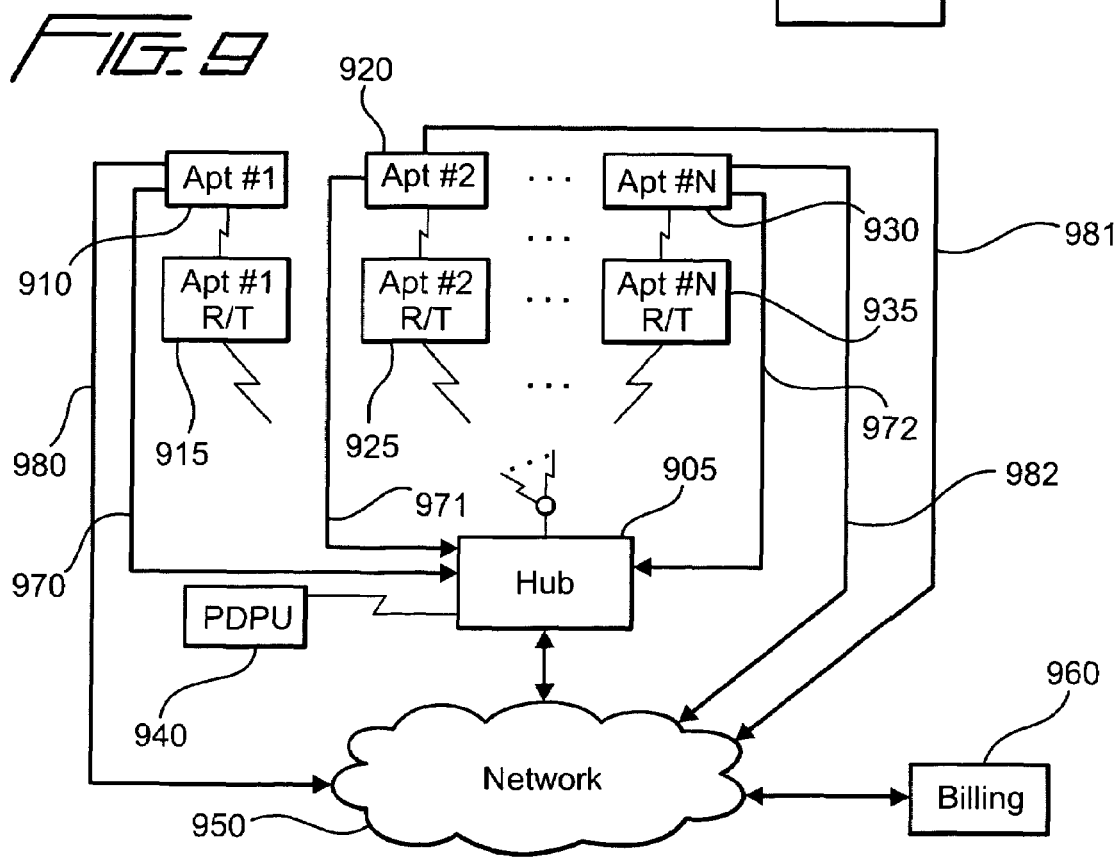

APPARATUS, SYSTEM AND METHOD FOR MONITORING, RECORDING AND BILLING FOR INDIVIDUAL FIXTURE AND UNIT WATER USAGE IN A MULTI-UNIT STRUCTURE

CROSS REFERENCE TO RELATED APPLICATION

This application claims the benefit of U.S. Provisional Application Ser. No. 60/669,383, filed Apr. 8, 2005, and U.S. Provisional Application Ser. No. 60/771,111, filed Feb. 8, 2006, both of which are incorporated herein in their entireties by reference.

TECHNICAL FIELD

The present invention relates to water use monitoring, recording and billing, and more particularly to monitoring, recording and billing for water use at both an individual fixture and dwelling unit-level in a multi-unit dwelling structure.

BRIEF DESCRIPTION OF THE DRAWINGS

FIGS. 6A-6E are various views of the fixture and the module of FIG. 5, in accordance with that embodiment of the present invention.

FIG. 8 is a system block diagram illustrating a configuration of a water usage monitoring and recording system in a multi-unit structure and the communications occurring therein, in accordance with an embodiment of the present invention.

FIG. 9 is a system block diagram illustrating a configuration of a water usage monitoring, recording and billing system in a multi-unit structure, in accordance with an embodiment of the present invention.

DESCRIPTION OF THE INVENTION

Figure 1:
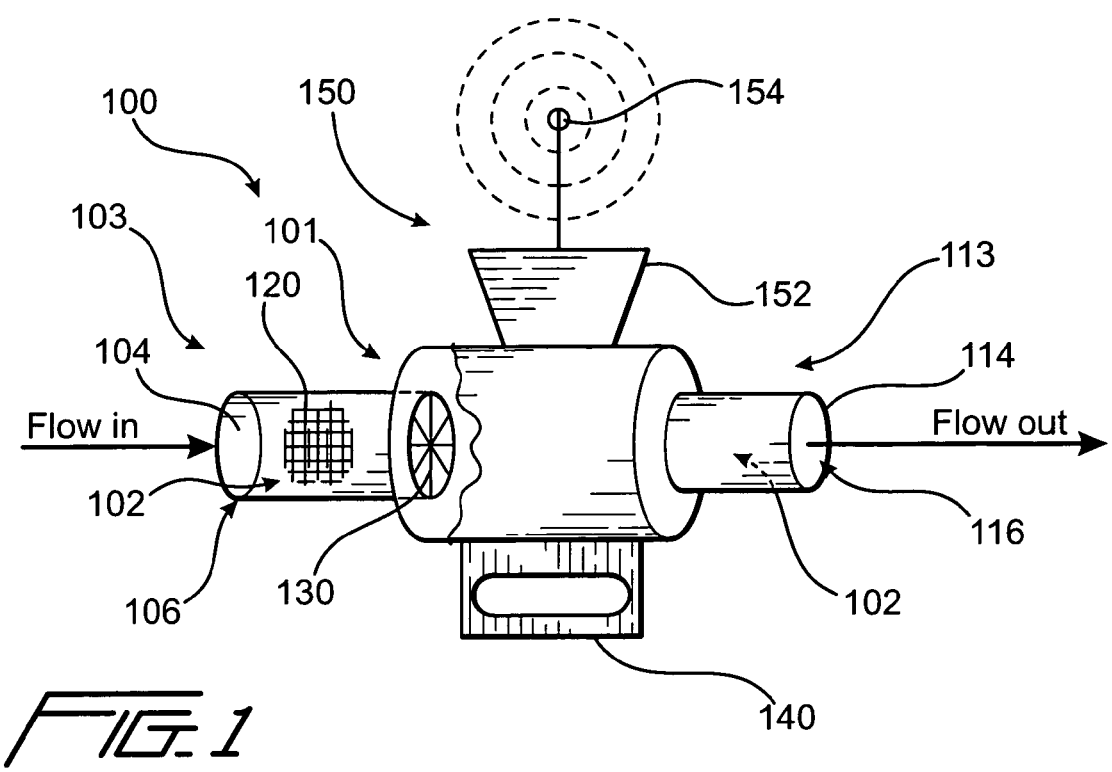
FIG. 1 is a partially exposed side view of a module, in accordance with an embodiment of the present invention.

In accordance with an embodiment of the present invention, a system for monitoring, recording and billing water usage for each plumbing fixture in each individual unit in a multi-unit structure (e.g., apartment buildings, office buildings, etc.) may be implemented to accurately bill tenants for only the water they actually use in their single unit in a multi-unit building. The system may include (e.g., comprise) a metering and power generating module, which may be referred to herein in both the singular and the plural as a "module." The system may also provide for additional water savings by metering water flow through efficient plumbing fixtures. The system may further increase water savings by automatically detecting leaks and/or when a fouling condition exists in an individual plumbing fixture. For example, fouling in the module can be automatically determined by detecting a change in differential pressure in the module. This may be accomplished by using, for example, a differential pressure sensor to constantly measure the pressure loss across a known pipe restriction and signal when a change in measured differential pressure exceeds a predetermined threshold amount. The signal may be accomplished by setting a flag in the flow information that is stored for transmission to a central communications hub or other recipient for immediate action. One example of a differential pressure sensor that may be used includes, but is not limited to, a Miniature Amplified Pressure Sensor, manufactured by All Sensors Corporation of Morgan Hill, Calif. Alternatively, in another embodiment an optical system may be used to detect the build-up of material on interior surfaces of the module as an indication of a fouling problem.

The specific detailed embodiments disclosed herein are merely illustrative of some of the possible design alternatives and, therefore, should not be construed as limiting the possible designs contemplated by the inventors.

In accordance with an embodiment of the present invention, the system may include, but not be limited to (i.e., comprise), one or more of some or all of the following components and/or features: efficient plumbing fixtures that are capable of dispensing water efficiently; a flow meter for monitoring water usage, storing of water usage data internally, developing the power necessary for all internal functions from the flow of water, and transmitting the water usage data to the central communications hub; a receiver/transmitter (R/T) to amplify signals received from modules that are not capable of adequately transmitting signals to the communications hub and/or a mesh-type network, for example, a ZigBee platform, may be used for the reception and transmission of the signals to the communications hub; the communications hub (CH) for receiving and processing water usage information from all the modules or the R/T; custom software (contained within the CH) to enable processing and reporting of the water usage information; and a portable data processing unit (PDTU), which is an optional device for extracting data from the CH and enabling troubleshooting and re-programming of the CH in the field. The software may be programmed in any of a number of programming languages (e.g., but not limited to, C++, Visual Basic, Java, Java Beans, XML, etc.) and may be stored on any of a variety of computer-readable and/or machine-readable storage media (e.g., but not limited to, CD, DVD, magnetic memory and/or drives, optical, flash memory, bubble memory, etc.)

In accordance with an embodiment of the present invention, fixtures may include, but are not limited to, for example, sink faucets, bathroom faucets, tub and shower faucets, shower heads, flow control fixtures for toilets, dishwashers and clothes washers, etc. In general, these fixtures may be implemented as water-efficient, low-flow fixtures to minimize the amount of water used.

In general, each module will generate signals that are unique to each apartment for purposes of identifying the location of the modules and subsequent data processing and billing. In addition, each module's signal may be unique to the module and thus the specific fixture in which the module is installed. This level of detail may be used to correctly prepare and bill the costs for the fluid, for example, water, used in each apartment and also to help pin point the exact location of a leak and/or tampering with a specific module and/or fixture. The signals generated may be received and retransmitted by one or more R/T units and/or by a mesh-type network in each apartment. For example, each apartment may have a local R/T unit that may be provided with constant electrical power (e.g., but not limited to, standard 120 volt AC electrical service as well as a battery backup) to retransmit the signal received from the specific module to the CH where total costs for each apartment may be calculated and a bill for each apartment may be generated. The need for R/Ts can occur when the distance between the module and the CH are excessive or there is significant electrical shielding between the module and the CH. In this case, the R/T may be used to amplify the signals from the modules and relay/re-transmit them to the CH. This relay/re-transmission may occur as a wireless communication as well as over dedicated and/or non-dedicated land-lines, for example, but not limited to, phone lines, a T1, ISDN, DSL, cable, satellite, optical, etc. In general, the receiver in the R/T receives signals in real-time from all modules in the same apartment. The transmitter in the R/T then forwards the information to the CH.

Alternatively, in accordance with another embodiment of the present invention, R/Ts may not be necessary, especially, when the module is capable of generating sufficient signal strength to be properly received by the CH.

In accordance with an embodiment of the present invention, the CH may receive water usage information from all modules in the building and process the water usage information for billing and historical reference purposes. In addition, the CH may monitor the water usage information and check for any signs of faulty module operation, leakages or tampering. If such a condition exists, a report may be generated and immediately transmitted to the appropriate personnel. The process used to detect faults, leaks or tampering, may, for example, be based on, but not be limited to, a comparison of current usage data against historical data. For example, if the toilet and kitchen faucet are indicating use in accordance with historical data, and the bathroom faucet is not, it may be a sign that the faucet has been tampered with or needs to be inspected.

In addition, the CH may allow tenants to securely access their individual water usage account through the Internet to get a real time reading of their current water use as well as their historical use. The CH may also generate reports of water use based upon a number of study criteria, for example, but not limited to: time of day, time of year, average use per day, per apartment, etc. Such data, if made available to tenants, may also provide a benchmark so the tenants can be informed of their water consumption and/or, if permitted, to compare their water use to that of other tenants.

For example, the CH may collect signals from all apartments in a single, multi-unit building/structure and process the data for billing each unit in the multi-unit building/structure. The CH may be accessed locally as well as remotely and may generate usage reports for each unit with details for each module in the unit. The unit may be programmed to detect leaks and/or tampering with individual modules and generate and send alerts to appropriate personnel.

In accordance with an embodiment of the present invention, the CH may include a custom software package to perform the necessary processing and generation of information and bills necessary to enable the above-described functions of the CH. In addition, additional software application(s) (i.e., user/client and/or system) may be implemented to enable residents of each unit to remotely access the records in the CH related to their specific unit using, for example, dial-up, networked, Internet connections directly from the CH and/or a central database system designed to collect and prepare individual bills for each unit. Likewise, additional software application(s) may be implemented to enable technicians and/or residents to locally access the records in the CH from hand-held devices (e.g., Personal Digital Assistants (PDAs), personal computers, cell phones, etc.)

In accordance with an embodiment of the present invention, a Portable Data Processing Unit (PDPU) may have a form factor similar to a PDA, a personal computer, a cell phone, etc. and be equipped with a wireless or non-wireless communication capability for uploading and downloading data to the CH. The PDPU may be programmed to access and receive data directly from the CH and also may be programmed to download the received data directly to a billing system for the output of individual bills. In addition, the PDPU may be able to communicate the received, as well as other, data using standard email software packages.

FIG. 1 is a partially exposed side view of a module, in accordance with an embodiment of the present invention. In FIG. 1, a module 100 is shown including a substantially cylindrical body 101 defining an interior passage 102 therein. Substantially cylindrical body 101 includes a proximal end 103 with a fluid inlet 104 defining a proximal end opening 106 in fluid communication with interior passage 102, a distal end 113 with a fluid outlet 114 defining a distal end opening 116 in fluid communication with interior passage 102 where interior passage 102 extends and is open between proximal end 103 and distal end 113. A flow straightener 120 is located in interior passage 102 downstream of fluid inlet 104 and flow straightener 120 operates to straighten the fluid flowing into fluid inlet 104. Straightening the fluid involves removing currents, whirlpools, etc. before the flow rate of the fluid is measured to improve the accuracy of the flow measurement. In an alternative embodiment flow straightener 120 may be implemented as a flow conditioner that would condition the fluid into a predictable flow geometry, for example, but not limited to, a spiral flow, that would allow improved accuracy in measuring the flow. In yet another embodiment, where accuracy will not affect the performance of the device, flow conditioning may be omitted.

In accordance with the embodiment of the present invention in FIG. 1, a flow measuring device 130, for example, a turbine flow meter, may be located downstream of the flow straightener 120, and measure the amount of water flowing through module 100 and send information on the amount of water measured to be stored for future transmission. In accordance with an embodiment of the present invention, some portion and/or all of the water flowing through module 100 may be diverted through a power generator 140 to produce an amount of power for signal processing and a telemetry component 150. Signal processing and telemetry component 150 may include signal processing and telemetry electronics 152 and a telemetry antenna 154. Signal processing and telemetry electronics 152 receives the flow information from a flow measuring device 130, for example, but not limited to, a flow turbine, and transmits the flow information through telemetry antenna 154 for processing at a communications hub. During periods of low water flow levels, power generator 140 is, generally, unable to supply sufficient power to enable signal processing and telemetry electronics 152 to transmit any flow information. Therefore, flow information received from a flow measuring device 130 may be stored in the signal processing and telemetry electronics 152 in a non-volatile memory circuit that does not require power. Once adequate power is available from power generator 140, for example, when the flow of water is high enough to produce the necessary power, telemetry system 150 may wirelessly transmit all of the flow information (e.g., any previously stored and currently measured flow information) to the communications hub for processing.

In accordance with the embodiment of the present invention illustrated in FIG. 1, module 100, generally, includes a flow sensor (e.g., but not limited to, a turbine flow meter) and a power generator 140 (e.g., but not limited to a turbine powered generator). Power generator 140, generally, is driven by the flow of some or all of the water through module 100. In the case of insufficient power generation, module 100 may be designed to continue monitoring the flow information from the internal flow sensor and store the data within the data processing and telemetry electronics 152 with and/or without the use of a battery. For example, when used, the battery may include, but is not limited to, a long life and/or a rechargeable battery. The storing of data may be accomplished without a battery using, for example, but not limited to, a capacitive based memory circuit or an electrically erasable programmable read only memory (EEPROM) circuit, and the like. As soon as an adequate flow of liquid (e.g., water) is available, power generator 140 may provide sufficient energy to data processing and telemetry electronics 152 to enable it to retrieve the history of flow information and wirelessly transmit the flow information to R/T and/or CH.

Figure 2:
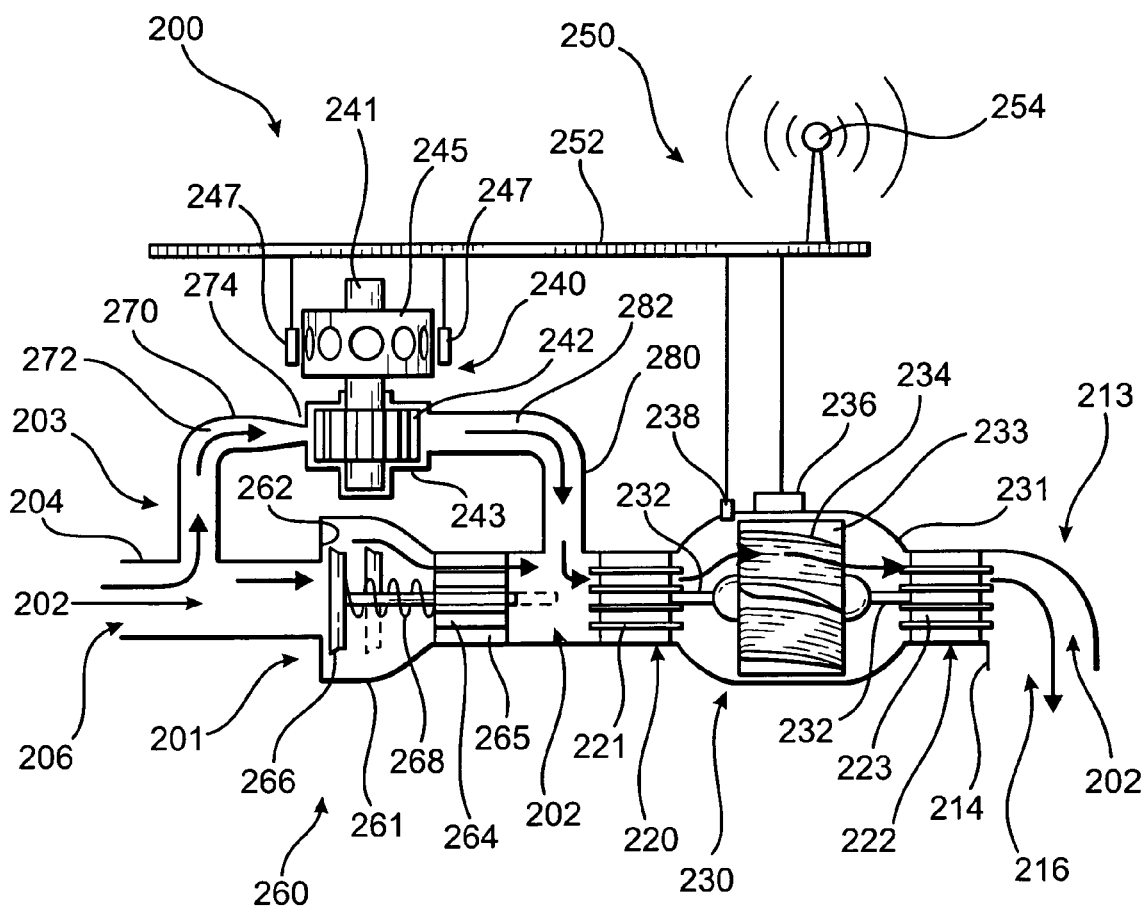
FIG. 2 is a cross-sectional side view of a module, in accordance with an embodiment of the present invention.

FIG. 2 is a cross-sectional side view of a module, in accordance with another embodiment of the present invention. In FIG. 2, in accordance with, but not limited to, the present embodiment, a module 200 is shown including a substantially cylindrical body 201 defining an interior passage 202 therein. Substantially cylindrical body 201 includes a proximal end 203 with a fluid inlet 204 defining a proximal end opening 206 in fluid communication with interior passage 202, a distal end 213 with a fluid outlet 214 defining a distal end opening 216 in fluid communication with interior passage 202, where interior passage 202 extends and provides for fluid communication between proximal end 203 and distal end 213.

In accordance with the embodiment of the present invention in FIG. 2, a pressure relief valve 260 is located in substantially cylindrical body 201 near proximal end 203 and includes a housing 261 that is coaxially aligned with substantially cylindrical body 201 and has a larger substantially frusto-conical shape with a front face 262 circumferentially surrounding and substantially perpendicular to substantially cylindrical body 201. Pressure relief valve 260 also includes a stopper 264 coaxially aligned with and disposed in substantially cylindrical body 201 distal to pressure relief valve 260. Stopper 264 includes a plurality of channels 265 arranged longitudinally around an outer edge of stopper 264 and each of the plurality of channels defines an open passageway for fluid communication from pressure relief valve 260 to substantially cylindrical body 201 distal to pressure relief valve 260. Pressure relief valve 260 also includes a valve 266 coaxially aligned with and moveably disposed in stopper 264 and biased against front face 262 by a biasing member 268, for example, but not limited to, a spring that is disposed between a back surface of valve 266 and stopper 264. Valve 266 may move distally within pressure relief valve 260 when the pressure from the fluid flowing against the valve exceeds a predetermined biasing force of biasing member 268 and return when the pressure falls below the predetermined biasing force. Valve 266 is biased by biasing member 268 against front face 262.

In accordance with the embodiment of the present invention in FIG. 2, a side passage 270 defines an interior passageway 272 and is connected to and in fluid communication with substantially cylindrical body 201 up stream of pressure relief valve 260. Side passage 270 may have a narrowed distal end 274, which may approximate a nozzle to increase the speed at which the fluid in side passage 270 enters a power generator 240, and also be in fluid communication with power generator 240 through narrowed distal end 274. Power generator 240 is in turn in fluid communication with return passage 280 that defines a return passageway 282 and is in fluid communication with substantially cylindrical body 201 downstream of pressure relief valve 260 and upstream of an inlet flow straightener 220, which is upstream an outlet flow straightener 222. Alternatively, a differential pressure sensor 238 may be included between, for example, inlet flow straightener 220 and outlet flow straightener 222 to measure the differential pressure in a flow meter 230 to detect a fouling condition.

In accordance with the embodiment of the present invention in FIG. 2, power generator 240 includes an axle 241 disposed perpendicular to a direction of flow of the fluid flowing through side passage 270, a fluid driver 242 coaxially aligned and engaged with axle 241 and fluid driver 242 is disposed in a fluid chamber 243. Fluid chamber 243 is in fluid communication with side passage 270 and return passage 280. Power generator 240 also includes a generator portion 245 coaxially aligned and engaged with axle 241 such that generator portion 245 is disposed outside of and is sealed off from fluid chamber 243. Generator portion 245 is designed to move substantially in unison with fluid driver 242 in reaction to the fluid flowing through the side passage 270 and past fluid driver 242 to generate power and to transmit the generated power via leads 247 to a telemetry electronics component 250.

In accordance with the embodiment of the present invention in FIG. 2, if the pressure from the fluid flowing against the valve is not sufficient to overcome the predetermined biasing force of biasing member 268, all of the fluid flowing in through inlet 206 will be diverted into interior passageway 272 of side passage 270. Alternatively, if the pressure from the fluid flowing against the valve is sufficient to overcome the predetermined biasing force of biasing member 268, only part of the fluid flowing in through inlet 206 will be diverted into interior passageway 272 of side passage 270 and the rest will flow around valve 266 through housing 261 and channels 265 in stopper 264 and back into interior passage 202 of substantially cylindrical body 201 downstream of stopper 264 at approximately the same spot that return passage 280 joins substantially cylindrical body 201.

In accordance with the embodiment of the present invention in FIG. 2, inlet flow straightener 220 is located in interior passage 202 downstream from where return passage 280 joins with substantially cylindrical body 201 and inlet flow straightener 220 operates to straighten the fluid flowing in interior passage 202. Inlet flow straightener 220 may include a plurality of straight channels and/or wall elements coaxially aligned with substantially cylindrical body 201. Straightening the fluid involves removing turbulence in the fluid flow that may otherwise diminish the accuracy of the flow measurement.

In accordance with the embodiment of the present invention in FIG. 2, flow meter 230, for example, a turbine flow meter, may be located downstream of and receive the straightened water flow from inlet flow straightener 220 to measure the amount of water flowing through flow meter 230, and this module 200, and send information on the amount of water flowing through flow meter 230. Flow meter 230 includes a flow meter housing 231 having a larger and substantially cylindrical shape and connected to and coaxially aligned with substantially cylindrical body 201. Flow meter 230 also includes a flow turbine axle 232 coaxially aligned with substantially cylindrical body 201, a turbine 233 coaxially aligned on flow turbine axle 232 and with substantially cylindrical body 201 and having a plurality of turbine blades 234 (hereinafter referred to as turbine blades 234). Each of turbine blades 234 is generally disposed at a slight angle to flow turbine axle 232 within turbine 233. Turbine 233 may have magnetic and non-magnetic materials mounted on/in the outer surface of one or more of turbine blades 234. A sensor device 236, for example, a magnetic sensor or a variable reluctance sensor, is attached to an exterior surface of flow meter 230 in line with turbine blades 234 to measure the rotation of turbine blades 234. Upon each complete rotation of turbine 233 such that at least one magnet or ferrous metal passes sensor device 236, so at least one signal is sent to the signal processing and telemetry electronics 252 from sensor device 236. In general, the number and frequency of the signals is directly relatable to the amount of fluid flowing through flow turbine 230, for example, if only one of turbine blades 234 contains a magnet or ferrous metal, then, once turbine 233 was spinning, each signal would indicate a single complete revolution of turbine 233. Similarly, if two or more turbine blades 234 contain magnets or ferrous metal, generally, for balance and stability reasons, the blades with the magnets or ferrous metal will be directly opposite each other on and/or evenly spaced around turbine 233. In those embodiments with two turbine blades 234 containing magnets or ferrous metal, every third signal (e.g., third, fifth, seventh, etc.) would indicate a complete revolution of turbine 233; if three turbine blades 234 contain magnets or ferrous metal, every fourth signal (e.g., fourth, seventh, tenth, etc.); and so on. For example, sensor device 236 may include, but not be limited to, a magnetic sensor like a Hall Effect sensor, a reed switch, a variable reluctance sensor, a piezoelectric sensor, a magnetostrictive sensor, etc., that sense the low energy magnetic field produced by the passing of the magnet or a variable reluctance sensor sensing the presence of a ferrous material in the flow turbine 230. However, in other embodiments, direct sensor mechanisms are also contemplated, such as for example, proximity measurement sensors and the like. Similarly, outlet flow straightener 222 may be configured similar to inlet flow straightener 220 and located in interior passage 202 substantially immediately distal to flow meter 230. Outlet flow straightener may include a second plurality of straight channels and/or wall elements 223 coaxially aligned with substantially cylindrical body 201 to straighten the fluid as it exits flow meter 230.

In accordance with the embodiment of the present invention in FIG. 2, a portion of the water flowing through module 200 may be diverted through a turbine generator 240 to produce an amount of power for telemetry electronics component 250, which may include telemetry electronics 252 and telemetry electronics antenna 254. Telemetry electronics 252 receives and, when power levels permit, transmits the flow information through telemetry antenna 254 for processing at a communications hub. During periods of low water flow levels when turbine generator 240 is unable to supply sufficient power to telemetry electronics 252 to transmit, the flow information received from flow turbine 230 may be stored in the signal processing and telemetry electronics 252 in a non-volatile memory circuit that does not require power to maintain the information stored therein. Once adequate power is available from turbine generator 240, for example, when the flow of water is high enough to produce the necessary power, telemetry system 250 may wirelessly transmit all the available flow information (e.g., stored and currently measured flow information) through telemetry antenna 254 to the communications hub for processing.

Figure 3:
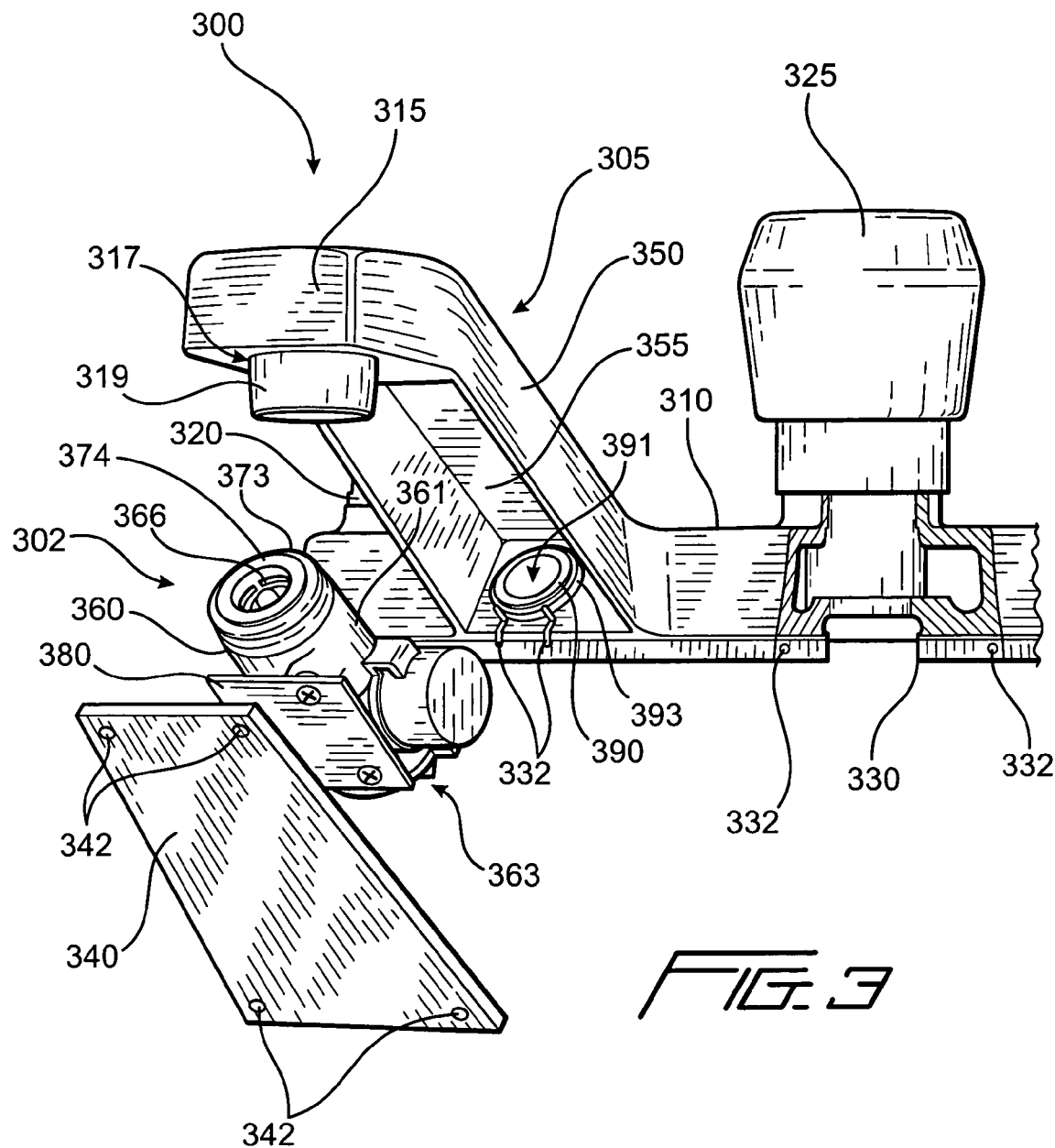
FIG. 3 is a partially exploded bottom perspective view of a fixture and a module showing the position of the module in the fixture, in accordance with an embodiment of the present invention.

FIG. 3 is a partially exploded, partially cut-away, bottom perspective view of a fixture and a module showing the position of the module in the fixture, in accordance with an embodiment of the present invention. In FIG. 3, the fixture may be a plumbing fixture assembly 300 and may include, for example, but is not limited to, a module assembly 302 and a standard or custom bathroom sink faucet 305. Sink faucet 305 is shown to include a base 310, a spout 315 extending at an angle upwardly and away from base 310, a hot water handle 320 (partially hidden by spout 315) extending straight up from a top of base 310, a cold water handle 325 that also extends straight up from a top of base 310. Spout 315 also defines an outlet 317 to permit water to exit spout 315 and an aerator 319 covering outlet 317. Faucet 305 may also include a base gasket 330 positioned beneath base 310 and in which an antenna 332 may be embedded (as part of the telemetry system) and run around the perimeter of gasket 330 and into spout 315 for connection to module assembly 302. Faucet 305 may still further include a bottom cover plate 340 for spout 315 to be used to seal module assembly 302 inside a portion of a neck 350 that defines a channel 355. Bottom cover plate 340 may be a substantially flat, rectangular plate as well as curved, molded, etc. to fit the bottom contour of the portion of the neck 350. Bottom cover plate 340 is to cover, conceal and protect module assembly 302 from tampering and/or unauthorized removal. As a result, bottom cover plate 340 may define a plurality of openings for fasteners, for example, but not limit to, screws, nuts, bolts, etc. that may align with cooperating openings on spout 315 to receive opposite fasteners and securely attach bottom cover plate 340 to spout 315. As seen in the embodiment shown in FIG. 3, antenna 332 extends up from gasket 330 into channel 350 and is positioned to connect to module assembly 302 when it is installed in channel 355.

In FIG. 3, module assembly 302 includes an electronic component 380, for example, signal processing and telemetry electronics, attached to a flow meter 360, which is adapted to fit securely in and form a water tight connection in spout 315 to permit water to flow from the hot and cold handles 320, 325 through sink faucet 305 and flow meter 360 and out spout 315 through aerator 319. Similar to FIGS. 1 and 2, in FIG. 3, flow meter 360 has a substantially cylindrical body 361 with an interior passage therein (not shown). Substantially cylindrical body 361 includes a proximal end 363 (i.e., an upstream end) with a fluid inlet defining a proximal end opening (not shown) in fluid communication with the interior passage, a distal end 373 (i.e., a downstream end) with a fluid outlet 374 defining a distal end opening 376 in fluid communication with the interior passage where the interior passage extends and is open between proximal end 363 and distal end 373. Flow meter 360 may be constructed and operate at least in accordance with the embodiments described in FIGS. 1 and 2.

In FIG. 3, proximal end 363 and distal end 373 may be adapted to be removably attached to and in spout 315 so as to effect a water-tight connection. To enable this water-tight connection, faucet 305 may include a spout inlet connector 390 defining a passage 391 with openings at each end to permit fluid to pass into spout 315 and a seal 393 that is coaxially aligned with and surrounding passage 391. For example, seal 393 may be a rubber "O-ring" that may be engaged in and held by a groove around spout inlet connector 390 and be adapted to form a watertight seal with proximal end 363 of flow meter 360. Distal end 373 may have a structure similar to spout inlet connector 390 and, although not shown, spout 315 may have a spout outlet connector located upstream of spout outlet 317 at a top of channel 355.

Figure 4:
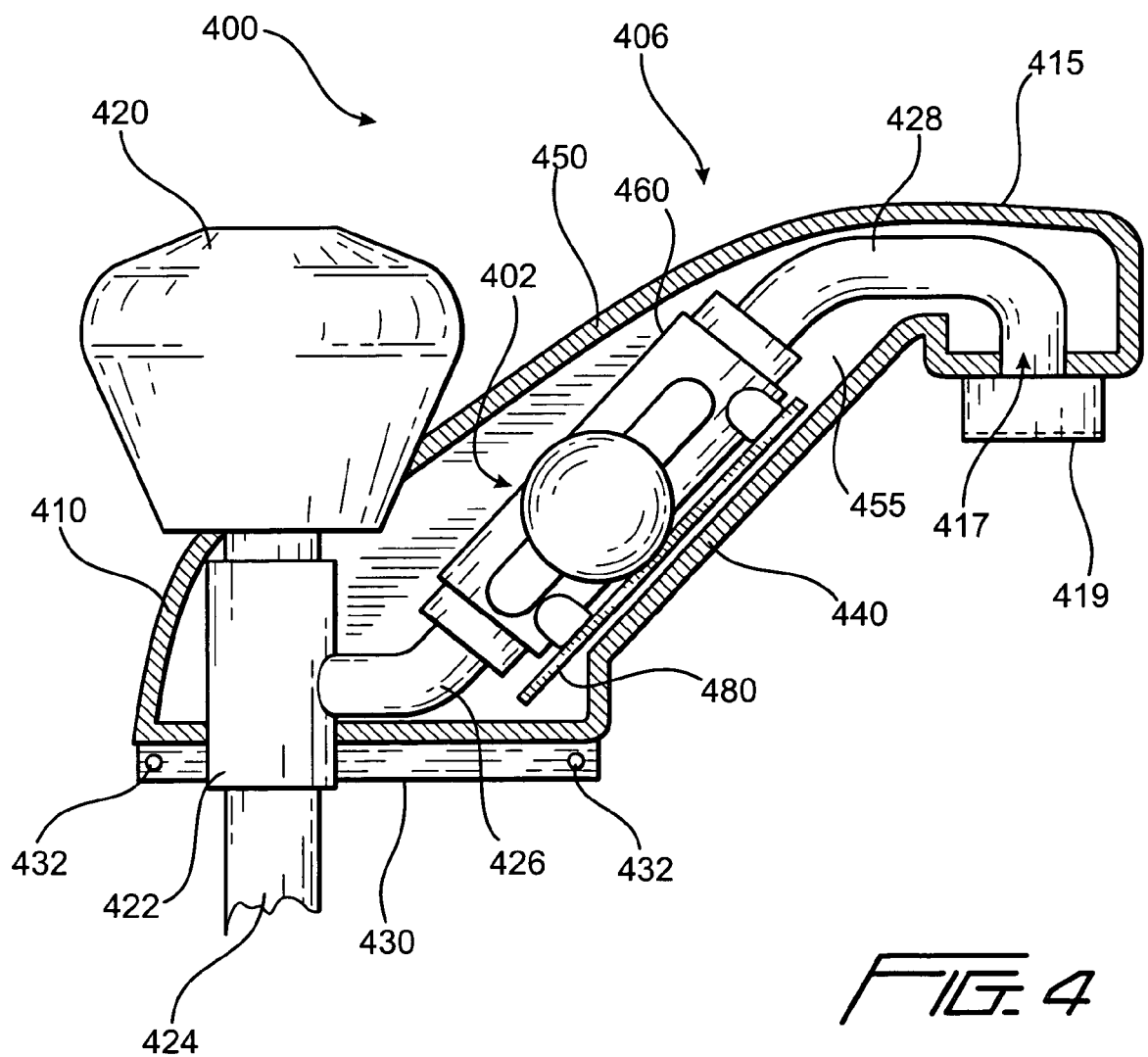
FIG. 4 is a cross-sectional side view of a fixture with a module installed after a hot and cold water mixing point and before an output end of the fixture, in accordance with an embodiment of the present invention.

FIG. 4 is a cross-sectional side view of a fixture with a module installed after a hot and cold water mixing point and before an output end of the fixture, in accordance with an embodiment of the present invention. In FIG. 4, a plumbing fixture assembly 400 may include, for example, but is not limited to, a module assembly 402 and a standard and/or custom sink faucet 405. Sink faucet 405 is shown to include a base 410, a spout 415 extending at an angle upwardly and away from base 410, and a single water handle 420 extending up from a top of base 410. Single water handle 420 is connected to and controls the flow of hot and cold water from each of a hot water supply line 424 and a cold water supply line (not shown), respectively. Water handle 420 is also connected to a water mixing element 422, which is in fluid communication with hot water supply line 424 and cold water supply line (not shown), and in which the hot and cold water from the supply lines are mixed. Water mixing element 422 is also connected to and in fluid communication with a proximal end of a lower spout water line 426 that is connected at a distal end to and in fluid communication with a proximal end of module 460. In turn, a distal end of module 460 is connected to and in fluid communication with a proximal end of an upper spout water line 428 and a distal end of upper spout water line 428 defines an opening near the end of spout 415. Alternatively, in another embodiment in accordance with the present invention, water handle 420 may be one of two, for example, a hot water handle or a cold water handle, and water mixing element 422 may be separately in fluid communication with the hot and cold water supply lines attached to the hot and cold water handles, respectively.

In FIG. 4, spout 415 also defines an outlet 417 to permit water to exit distal end of upper spout water line 428 and an aerator 419 covering outlet 417. Faucet 405 may also include a base gasket 430 positioned beneath base 410 and in which an antenna 432 may be embedded and run around the perimeter of gasket 430 and into spout 415 for connection to module assembly 402. Faucet 405 may still further include a bottom cover plate 440 for spout 415 to be used to seal module assembly 402 inside a portion of a neck 450 that defines a channel 455. Bottom cover plate 440 may be a substantially flat, rectangular plate as well as curved, molded, etc. to fit the bottom contour of the portion of the neck 450 and cover, conceal and protect module assembly 402 from tampering and/or unauthorized removal. Bottom cover plate 440 may define a plurality of openings for fasteners, for example, but not limit to, screws, nuts, bolts, etc. that may align with cooperating openings on spout 315 to receive fasteners and securely attach bottom cover plate 440 to spout 415. Although not shown in FIG. 4, antenna 432 may extend from gasket 430 into channel 455 to connect to module assembly 402 to enable signal processing and telemetry electronics component 480 to transmit water usage data for the faucet 405. Module assembly 402 may include a module 460 and a signal processing and telemetry electronics component 480 that are in electrical communication with each other to permit the transmission of flow information and electrical current from module 460 to signal processing and telemetry electronics component 480.

Figure 5:
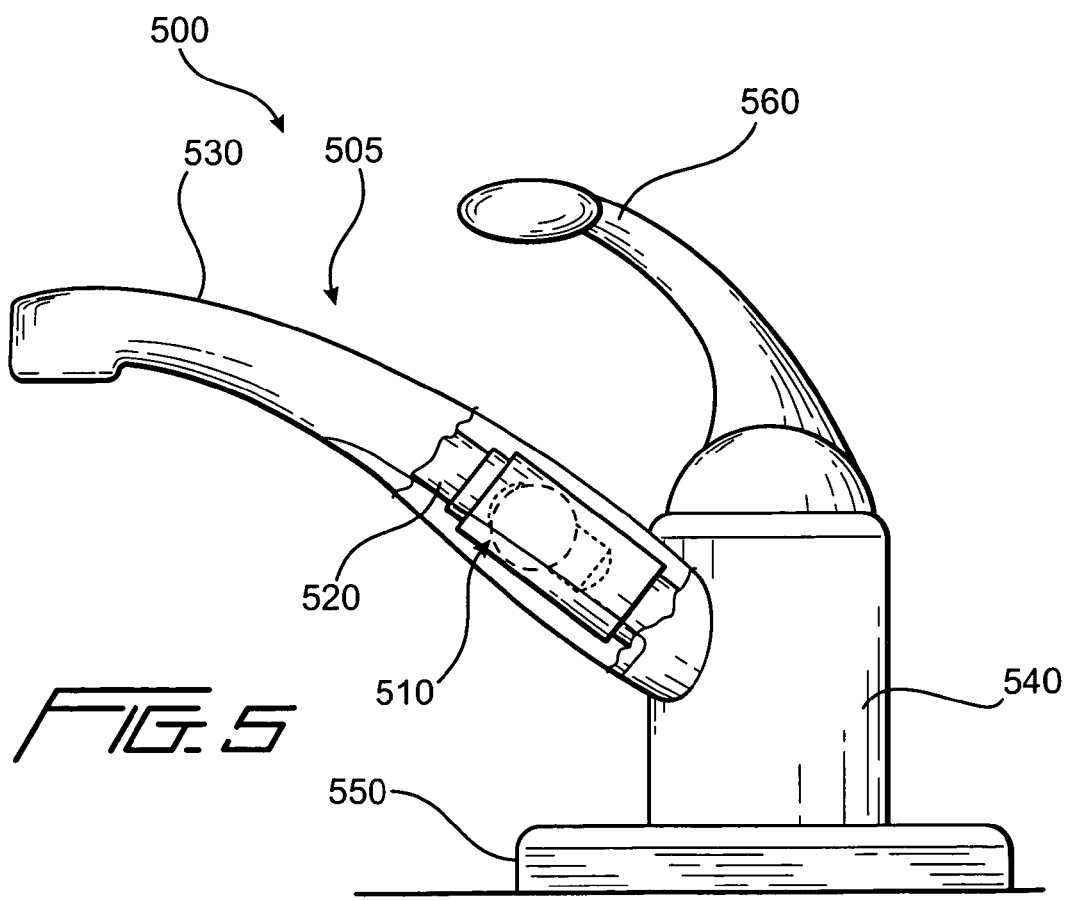
FIG. 5 is a partially exposed side view of a fixture with a module installed after a hot and cold water mixing point and before an output end of the fixture, in accordance with another embodiment of the present invention.

FIG. 5 is a partially exposed side view of a fixture with a module installed after a hot and cold water mixing point and before an output end of the fixture, in accordance with another embodiment of the present invention. In FIG. 5, a faucet assembly 500 includes a kitchen faucet 505 and a module assembly 510 connected in the middle of a water outlet line 520 inside of a spout 530 with proximal and distal ends such that the distal end defines an outlet for water and the proximal end is connected to body portion 540 near a top end. A bottom of body portion 540 is connected to a base 550 and the top of body portion 540 is connected to a bottom of a handle 560 that controls the total amount of water that can flow through faucet assembly 500 and how much of the total amount of water is hot and cold water. In general, body portion 540 is rotably connected to base 550 to permit faucet 505 to rotate around an axis that is substantially perpendicular to base 550. In addition, the hot and cold water mixing point is generally, located in body 540 in this embodiment. Handle 560 is connected to body portion 540 by a ball and socket mechanism to permit handle 560 to move upward and backward and to the left and right around the top of body portion 540.

FIG. 6A is a top view of the faucet assembly of FIG. 5, in accordance with that embodiment of the present invention. In FIG. 6A, spout 530 has a wide lower portion 532 that is connected to body 540 and a narrow upper portion 534 through which water exits faucet 505. Wider lower portion 532 is configured to provide sufficient room for a module assembly to be installed therein, in accordance with an embodiment of the invention.

FIG. 6B is a side view of the faucet assembly of FIG. 5, in accordance with that embodiment of the present invention. In FIG. 6B, spout 530 has an access cover 610 on a lower surface extending from wide lower portion 532 near where it is connected to body 540 upward toward narrow upper portion 534. Access cover 610 may be removably attached to spout 530 to permit access to repair and/or replace module assembly 402 (shown in FIG. 6E). However, in general, access cover 610 is attached using non-standard fasteners to prevent unauthorized access to and tampering with module assembly 402.

FIG. 6C is a side perspective view of the faucet assembly of FIG. 5 that further shows the position of access cover 610 on the lower surface of spout 530, in accordance with that embodiment of the present invention.

FIG. 6D is a bottom view of the faucet assembly of FIG. 5 generally showing the position of access cover 610 on the lower surface of spout 530, in accordance with that embodiment of the present invention. In FIG. 6D, access cover 610 is attached to the lower surface of spout 530 by fasteners 620 to deter efforts to tamper with or disable the module assembly. For example, the fasteners may include, but are not limited to, tamper resistant screws with non-standard heads such as a star, a square, etc.

FIG. 6E is a bottom view of spout 530 of FIG. 5 with access cover 610 removed to reveal an opening 630 in the lower surface of and module assembly 402 in spout 530, in accordance with that embodiment of the present invention. In FIG. 6E, flanges 640 are located in each corner of opening 630 and each define a fastener opening 642 that aligns with and receives fasteners 620 from access cover 610. Flanges 640 may be recessed from the lower surface of spout 530 to permit a smooth transition between access cover 610 and the lower surface of spout 530.

Figure 7:
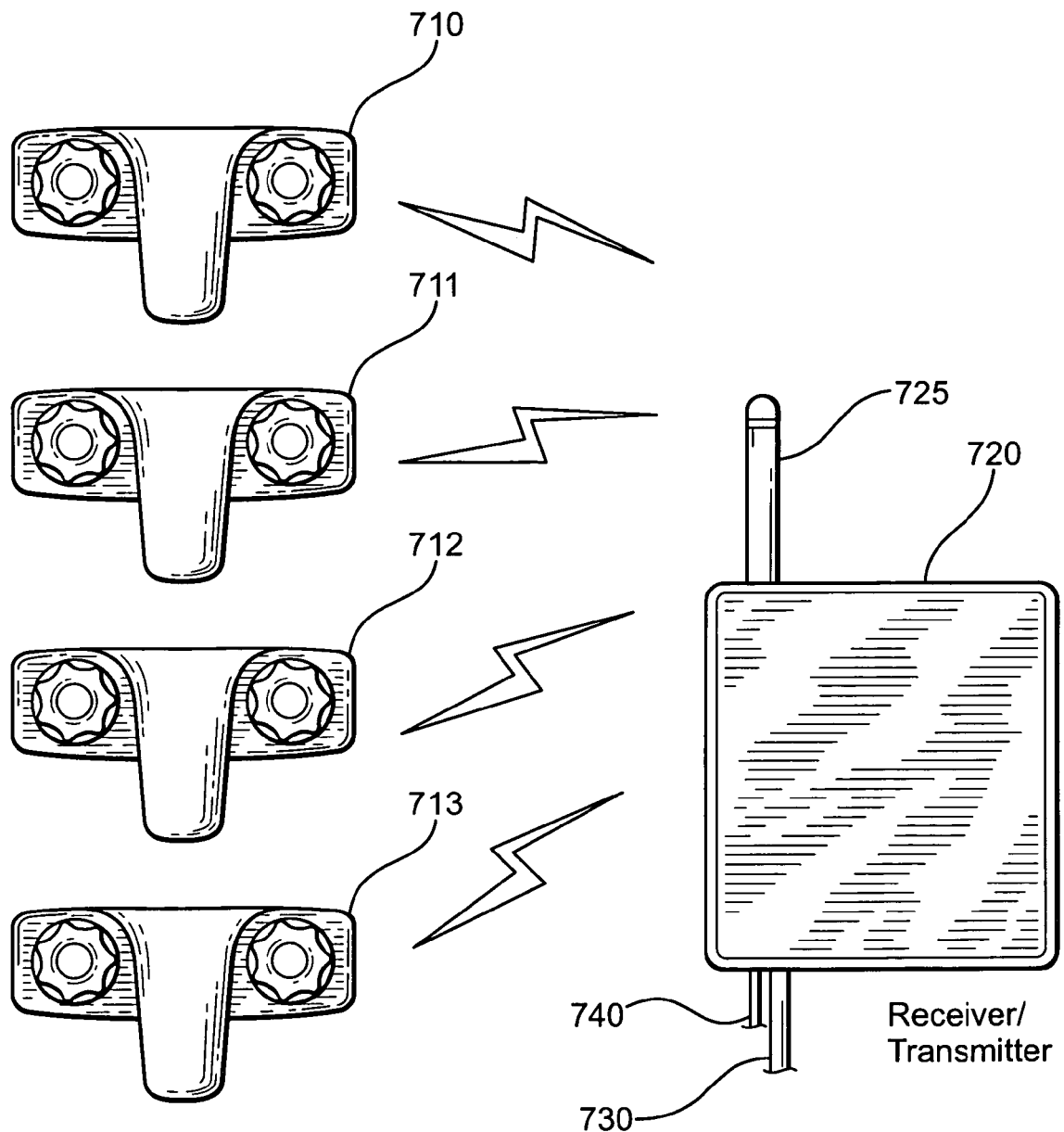
FIG. 7 is a functional block diagram of multiple fixtures, each with a module installed therein, in communication with a receiver/transmitter component, in accordance with an embodiment of the present invention.

FIG. 7 is a functional block diagram of multiple fixtures, each with a module installed therein, in communication with a receiver/transmitter component, in accordance with an embodiment of the present invention. In FIG. 7, each of the multiple fixtures 710, 711, 712, 713 may be a standard and/or a custom bathroom faucet and is shown to be independently sending/broadcasting a signal to a receiver/transmitter 720. Receiver/transmitter 720 may include an antenna 725 and also may be hardwired to have an electrical power supply line 730, and a telephone/communication line 740. Antenna 725 may be used to receive the incoming signals from the fixtures and, if necessary, to also transmit the received signals on to a communications hub (not shown). However, transmissions from receiver/transmitter 720 to the communications hub are, generally, made over telephone/communication line 740 to permit receiver/transmitter 720 to simultaneously receive wireless transmissions from one or more of fixtures 710, 711, 712, 713 and transmit already received information over telephone/communication line 740. In another embodiment in accordance with the present invention, if a mesh-type network is used, the communications may occur between the multiple fixtures to accumulate the signals into the fixture that is closest to receiver/transmitter 720. For example, if a fourth fixture 713 is the closest to receiver/transmitter 720, this may occur by sending a signal from a first fixture 710 to a second fixture 711 where the signal from first fixture 711 is combined with a signal at second fixture 711, then sending the combined signal from second fixture 711 to a third fixture 712 where the combined signal from second fixture 711 is combined with a signal at third fixture 712, and sending the combined signal from third fixture 712 to a fourth fixture 713 where the combined signal from third fixture 712 is combined with a signal from fourth fixture 713. The combined signal, which now represents the cumulative signals from first through fourth fixtures 710, 711, 712, 713, may be sent from fourth fixture 713 to receiver/transmitter 720. The order of transmission is not important and may still occur even if not all of the fixtures are capable of receiving and sending signals.

FIG. 8 is a system block diagram illustrating a configuration of the system in a multi-unit structure and the communications occurring therein, in accordance with an embodiment of the present invention. In FIG. 8, a first apartment 810 (i.e., Apartment #1) is shown with multiple modules that have been installed in multiple plumbing fixtures and that are transmitting data to a R/T 815 associated with first apartment 810. In addition, top-level representations of other apartments 820, 830 (i.e., Apt #2 and Apt #N, respectively) and the fixture and modules therein in communication with the R/Ts 825, 835 associated with each apartment (i.e., Apt #2 R/T and Apt #N R/T, respectively). Each of the R/Ts 815, 825, 835 may also be in communication with a CH 840 to download the flow data collected from each module to CH 840. As described above, the communication between each R/T 815, 825, 835 and CH 840 may be accomplished using wireless as well as wired communications.

FIG. 9 is a system block diagram illustrating another configuration of the system in a multi-unit structure, in accordance with an embodiment of the present invention. In FIG. 9, which is similar in structure to FIG. 8, a system 900 is shown to provide various communication paths between a hub 905 (e.g., a communications hub), multiple dwelling units 910, 920, 930, a PDPU 940, a network (e.g., but not limited to, the Internet, a Local Area Network (LAN), etc.) 950, and a billing component 960. Although in FIG. 9, the billing component is shown as a separate component connected to network 950, it also may be implemented in hub 905. Associated with each of the multiple dwelling units 910, 920, 930 is a R/T 915, 925, 935, respectively, that receives the data transmitted from the associated unit and re-transmits the data to hub 905. Although shown in a one-to-one ratio, in other embodiments of the present invention, a single R/T may be associated with two or more dwelling units to receive and re-transmit the data to hub 905 from each of the dwelling units independently of the dwelling units. Other embodiments are also contemplated in which R/T's are not needed and each fixture has enough power to transmit the flow information directly to hub 905.

In FIG. 9, hub communication lines 970, 971, 972 are connected between one of multiple dwelling units 910, 920, 930, respectively, and hub 905 to enable an occupant of each unit to access the data stored in hub 905 on the amount of water used in their unit. Because the data is collected from each fixture in each dwelling unit, the data may be viewed for each fixture in a unit as well as an aggregated total for the unit. Having access to this data can help occupants keep track of their own water usage, which may be used to help them manage the amount of water they use in the future. Similarly, network communication lines 980, 981, 982 are connected to network 950 from one of multiple dwelling units 910, 920, 930, respectively, to enable occupants of each unit to access billing system 960 and to manage their own specific account. This may entail viewing account status and amounts due and also to permit online payment of amounts due on the occupant's account.

Figure 10:
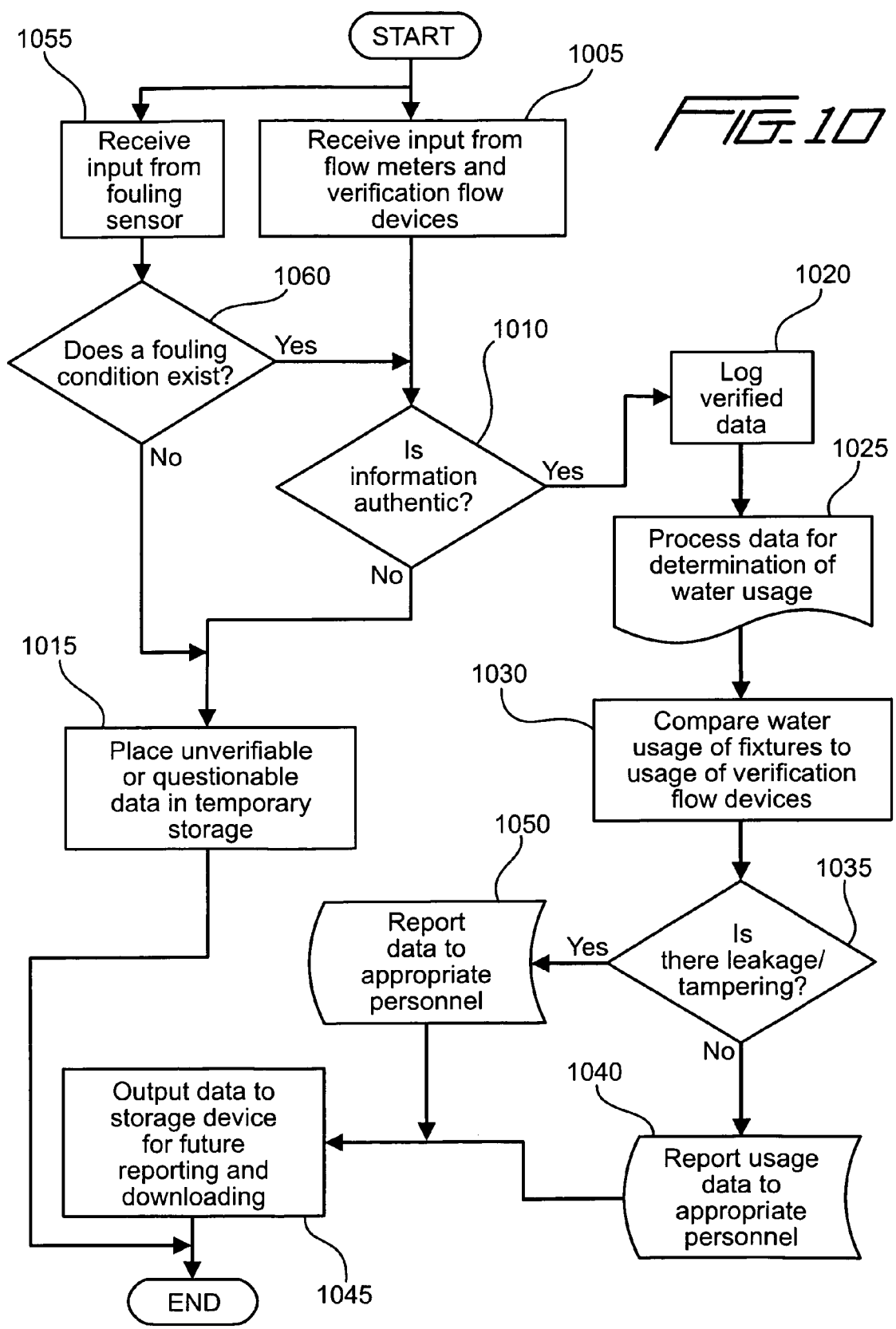
FIG. 10 is a flow diagram of functions occurring in a communications hub following the receipt of flow information from one or more modules, in accordance with an embodiment of the present invention.

FIG. 10 is a flow diagram of functions occurring in a communications hub following the receipt of flow information from one or more modules, in accordance with an embodiment of the present invention. In FIG. 10, the functions include receiving (1005) input from multiple modules and verification flow devices, i.e., flow metering devices separate and apart from the modules that also measure the flow of water into a unit, generally, at a higher level. For example, the verification flow devices may be installed on main water lines coming into or, in some cases, exiting each unit. The functions also include verifying (1010) the authenticity of the received information and, if the information is unverifiable (1010), placing (1015) the unverifiable, questionable, and/or fouling condition information in a temporary storage in the communications hub. However, if the information is verifiable (1010), logging (1020) of the verified information occurs and processing (1025) of the verified information is performed to determine the amount of water used through each fixture in each unit. The functions also include comparing (1030) the amount of water usage measured for the fixtures to the amount measured by the verification flow devices. If it is determined (1035) that there are no leaks and/or tampering with any modules in a unit, then reporting (1040) of the good usage data to appropriate personnel having access to the communications hub occurs and outputting (1045) of the good usage data to a storage device for future reporting and downloading occurs. Conversely, if it is determined (1035) that there are leaks and/or tampering, then reporting (1050) of the bad usage data to appropriate personnel having access to the communications hub occurs and outputting (1045) of the bad usage data to a storage device for future reporting, trouble-shooting and downloading occurs. This permits rapid response by the appropriate personnel to fix leaking and/or fouled flow meters and to restore normal operation of any tampered with modules.

In the present embodiment shown in FIG. 10, simultaneously with and/or independently of the previously described functions, additional functions may include receiving (1055) an input from a fouling sensor and determining (1060) whether a possible fouling condition exists. The fouling sensor may operate independently of and/or in conjunction with the rest of the module, but the information received from the fouling sensor will, generally, be used in conjunction with the information received from the rest of the module. If it is determined (1060) that a fouling condition does not exist, verifying (1010) the authenticity of the received (1005) information may occur and the same functions as described above following verifying (1010) may be performed. If it is determined (1060) that a fouling condition does exist, placing (1015) the fouling data in temporary storage and notifying appropriate personnel occurs.

Figure 11:
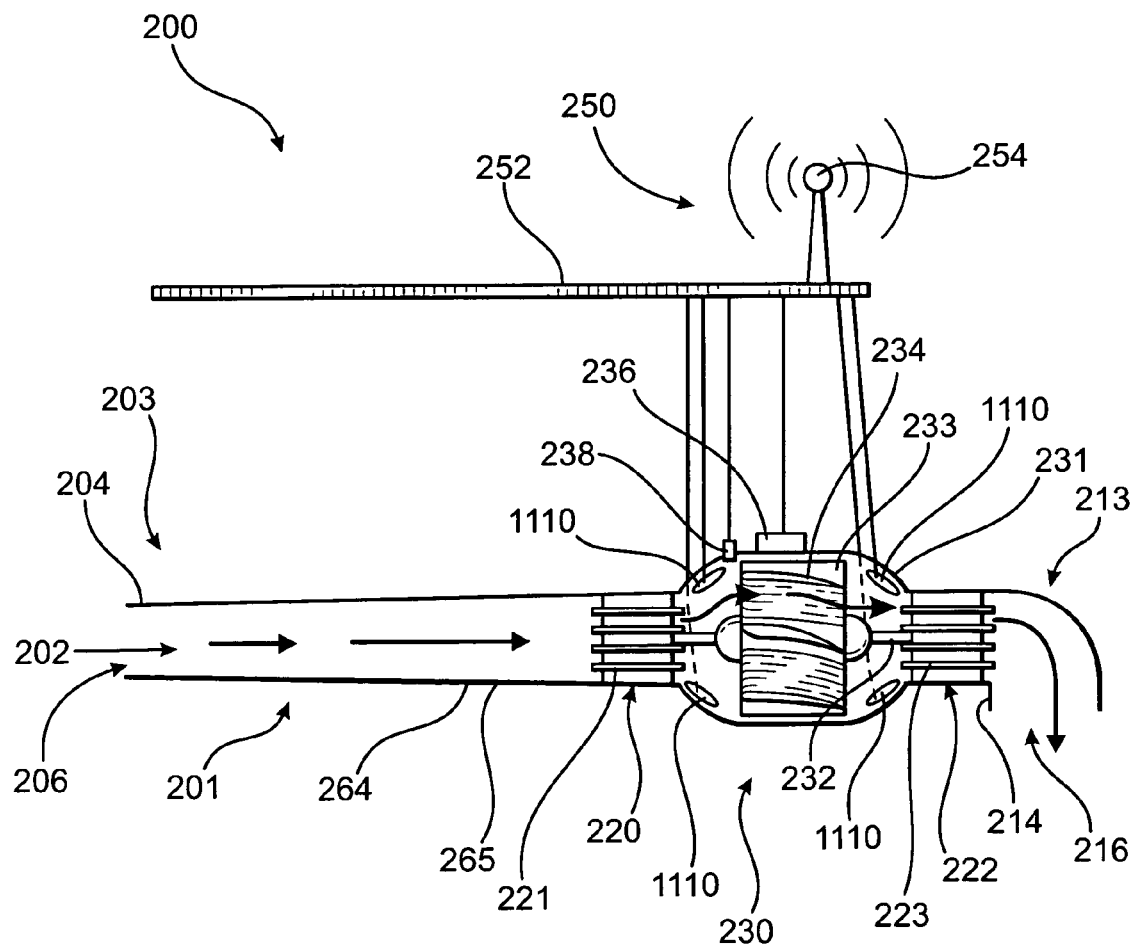
FIG. 11 is a cross-sectional side view of a module, in accordance with another embodiment of the present invention.

FIG. 11 is a cross-sectional side view of an alternative embodiment of the module in FIG. 2 with one (1) or more sensors 1110 constructed of magnetostrictive and/or piezoelectric materials utilized for flow sensing and/or power generation, in accordance with another embodiment of the present invention. In FIG. 11, in accordance with, but not limited to, the present embodiment, module 200 is shown including substantially cylindrical body 201 defining interior passage 202 therein. Substantially cylindrical body 201 includes proximal end 203 with fluid inlet 204 defining proximal end opening 206 in fluid communication with interior passage 202, distal end 213 with fluid outlet 214 defining distal end opening 216 in fluid communication with interior passage 202 where interior passage 202 extends and provides for fluid communication between proximal end 203 and distal end 213.

In accordance with an embodiment of the present invention in FIG. 11, inlet flow straightener 220 is located in interior passage 202 downstream from proximal end opening 206. Inlet flow straightener 220 may include a plurality of straight channels and/or wall elements 221 coaxially aligned with substantially cylindrical body 201. Straightening the fluid involves removing turbulence in the fluid flow that may otherwise diminish the accuracy of the flow measurement.

In accordance with an embodiment of the present invention in FIG. 11, flow meter 230, for example, a turbine flow meter, may be located downstream of and receive the straightened water flow from inlet flow straightener 220 to measure the amount of water flowing through flow meter 230, and this module 200, and send information on the amount of water flowing through flow meter 230. Flow meter 230 includes flow meter housing 231 having a larger and substantially cylindrical shape and connected to and coaxially aligned with substantially cylindrical body 201. Flow meter 230 also includes flow turbine axle 232 coaxially aligned with substantially cylindrical body 201, turbine 233 coaxially aligned on flow turbine axle 232 and with substantially cylindrical body 201 and having turbine blades 234. Each of the turbine blades 234 is generally disposed at a slight angle to flow turbine axle 232 within turbine 233. Turbine 233 may have magnetic and non-magnetic materials mounted on/in the outer surface of the turbine blades 234. A sensor device 236, for example, a magnetic sensor or a variable reluctance sensor, is attached to an exterior surface of flow meter 230 in line with the turbine blades 234 to measure the rotation of turbine blades 234. Upon each complete rotation of turbine 233 such that at least one magnet or metal passes sensor device 236, so at least one signal is sent to the signal processing and telemetry electronics 252 from sensor device 236. In general, the number and frequency of the signals is directly relatable to the amount of fluid flowing through flow turbine 230, for example, if only one of turbine blades 234 contains a magnet or metal, then, once turbine 233 was spinning, each signal would indicate a single complete revolution of turbine 233. Similarly, if two or more turbine blades 234 contain magnets or metal, generally, for balance and stability reasons, the blades with the magnets or metal will be directly opposite each other on and/or evenly spaced around turbine 233. In those embodiments with two turbine blades 234 containing magnets or metal, every third signal (e.g., third, fifth, seventh, etc.) would indicate a complete revolution of turbine 233; if three turbine blades 234 contain magnets or metal, every fourth signal (e.g., fourth, seventh, tenth, etc.); and so on. For example, sensor device 236 may include, but not be limited to, a magnetic sensor like a Hall Effect sensor, a reed switch, a variable reluctance sensor, a piezoelectric sensor, a magnetostrictive sensor, etc., that sense the low energy magnetic field produced by the passing of the magnet or a variable reluctance sensor sensing the presence of a material in the flow turbine 230. However, in other embodiments, direct sensor mechanisms are also contemplated, for example, proximity measurement sensors and the like. Outlet flow straightener 222 may be located in interior passage 202 substantially immediately distal to flow meter 230. Outlet flow straightener 222 may include a second plurality of straight channels and/or wall elements 223 coaxially aligned with substantially cylindrical body 201 to straighten the fluid as it exits flow meter 230.

In FIG. 11, one or more sensors 1110, constructed of, for example, magnetostrictive and/or piezoelectric materials, may be installed on and/or embedded in or on an inner surface of flow meter housing 231. Each sensor may be used to sense the flow rate of fluid flowing through flow turbine 230 and/or to generate power. In fact, sensor device 236 may be replaced by one or more sensors 1110, which will count each complete rotation of turbine blades 234, as described above for sensor device 236. In addition, the one or more sensor 1110 may generate power as a result of the turning of blades 234. For example, the same sensor 1110 used to count blade rotations, and thus flow rate, may be used to generate power. Alternatively, a single sensor 1110 may be used to count blade rotations and one or more additional sensors 1110 may be spaced around flow water housing to generate power as blades 234 rotate within flow meter 230.

An embodiment of the present invention may include a method of measuring fluid use, for example, water use, at each individual fixture level in a multi-unit structure. The method includes measuring flow information of a fluid flowing through each fixture in a single unit in a multi-unit structure using a module assembly installed inside each fixture; and generating and storing power in the module assembly from the fluid flowing through each module assembly inside each fixture. The method also includes, when available power in any module assembly is sufficient to transmit, transmitting the flow information with a unique identifier associated with each module assembly with sufficient power in a wireless transmission. The method further includes, when available power in any module assembly is insufficient to transmit, accumulating the flow rate information for each module assembly with insufficient power in a storage area in that module assembly for later transmission when sufficient power is available. The method further still includes processing the measured fluid flow received from each fixture to determine a cost of the fluid associated with each fixture and a total cost of the fluid associated with the single unit; and generating a bill for the total cost of the fluid associated with the single unit.

An embodiment of the present invention may include a plumbing fixture assembly, where the plumbing fixture assembly includes a plumbing fixture and a wireless flow metering apparatus installed within the plumbing fixture. The wireless flow metering apparatus includes an inlet portion defining an inlet opening and adapted to be in fluid communication with a fluid inlet line; a first flow conditioner in fluid communication with and adapted to receive and condition a fluid flowing through the inlet opening; a flow measuring device in fluid communication with the first flow conditioner and adapted to measure the conditioned fluid as the conditioned fluid flows past the flow measuring device and to generate a signal representing an amount of the conditioned fluid flowing past the flow measuring device; an optional second flow conditioner in fluid communication with and to receive the conditioned fluid from the flow measuring device and to condition the conditioned fluid; a power generator in fluid communication with the fluid inlet opening and to receive at least part of the fluid flowing through the inlet opening and to generate and supply power using at least part of the fluid flowing through the inlet opening; an electronic component adapted to receive and store the power from the power generator or flow sensing device and to store the signal representing the measured amount of the conditioned fluid received from the flow measuring device using the power from the power generator or flow sensing device and, when sufficient power is available, to transmit the stored signal representing the measured volume of the displaced conditioned fluid to a monitoring system; and an outlet portion defining an outlet opening and adapted to be connected to an outlet line, the outlet portion in fluid communication with the inlet portion and to allow the conditioned fluid that flows past the flow measuring device to exit the apparatus through the outlet opening.

An embodiment of the present invention may include a method of measuring fluid flow for each individual fixture in a single unit in a multi-unit structure. The method includes measuring and storing flow information for a fluid flowing through each of a plurality of fixtures in a single unit in a multi-unit structure using an independent module assembly installed inside each fixture; generating and storing power from the fluid flowing through each module assembly in each of the plurality of fixtures; when available power in any module assembly is sufficient to transmit, transmitting in a wireless transmission the flow information with a unique identifier associated with each module assembly; if available power in any module assembly is insufficient to transmit, accumulating the flow information for each module assembly in a storage area in that module assembly; processing the measured fluid flow received from each fixture to determine a cost of the fluid that flowed through each fixture in the single unit and a total cost of the fluid that flowed through all of the fixtures in the single unit; and generating a bill for the total cost of the fluid for the single unit.

An embodiment of the present invention may include a metering and reporting system. The system includes a fixture assembly including a plumbing fixture; and a wireless metering apparatus installed and concealed in the plumbing fixture, the wireless metering apparatus having an inlet portion defining an inlet opening and adapted to be connected to and in fluid communication with a fluid inlet line; a first flow conditioner in fluid communication with and adapted to receive and condition a fluid flowing through the inlet opening; a flow measuring device in fluid communication with and adapted to measure the conditioned fluid as the conditioned fluid flows past the flow measuring device and to generate a signal representing an amount of the conditioned fluid flowing past the flow measuring device; an optional second flow conditioner in fluid communication with and to receive the conditioned fluid from the flow measuring device and to condition the conditioned fluid; a power generator in fluid communication with the inlet opening and to receive at least part of the fluid flowing through the inlet opening and to generate and supply power using the at least part of the fluid flowing through the inlet opening; an electronic component adapted to receive the power from the power generator and to store the signal representing the measured amount of the conditioned fluid received from the flow measuring device using the power from the power generator or flow sensing device and, when sufficient power is available, to transmit the stored signal representing the measured amount of the conditioned fluid to a monitoring system; and an outlet portion defining an outlet opening and adapted to be connected to an outlet line, the outlet portion in fluid communication with the inlet portion and to allow the conditioned fluid that flows past the flow measuring device to exit the apparatus through the outlet opening; a local receiver/transmitter component to receive transmissions from the fixture assembly containing information on the amount of fluid flowing through the fixture assembly and to forward the transmissions; a hub to receive the forwarded transmissions of the information on the amount of fluid flowing through the plumbing fixture from the local receiver/transmitter, to process the information, and to transmit the processed information for billing; and a processing system programmed to receive the processed information on the amount of fluid flowing through the plumbing fixture, determine a cost associated with the amount of fluid flowing through the plumbing fixture, allocate the cost to an account, and bill an owner of the account for the cost.

An embodiment of the present invention may include an apparatus for measuring fluid flow for each individual fixture in a single unit in a multi-unit structure. The apparatus includes means for measuring and storing flow information for a fluid flowing through each of a plurality of fixtures in a single unit in a multi-unit structure, and each means for measuring and storing operates independently of all other means for measuring and storing; means for generating and storing power from the fluid flowing through each of the plurality of fixtures; means for transmitting in a wireless transmission the flow information with a unique identifier associated with each of the plurality of fixtures having sufficient stored power to transmit the flow information; means for accumulating the flow information in a storage area for each of the plurality of fixtures with insufficient stored power to transmit the flow information; means for processing the measured fluid flow received from each of the plurality of fixtures to determine a cost of the fluid that flowed through each fixture in the single unit and a total cost of the fluid that flowed through all of the fixtures in the single unit; and means for generating a bill for the total cost of the fluid for the single unit.

An embodiment of the present invention may include an apparatus for measuring fluid flow in an individual fixture. The apparatus including an inlet portion defining an inlet opening and adapted to be connected to and in fluid communication with a fluid inlet line; a first flow conditioner in fluid communication with and adapted to receive and condition a fluid flowing through the inlet opening; a flow measuring device in fluid communication with the first flow conditioner and adapted to measure the conditioned fluid as the conditioned fluid flows past the flow measuring device and to generate a signal representing an amount of the conditioned fluid flowing past the flow measuring device; a power generator in fluid communication with the first flow conditioner and adapted to generate and supply power; an electronic component adapted to receive and store the generated power from the power generator and to store the signal representing the measured amount of the conditioned fluid received from the flow measuring device using the power from the power generator or flow sensing device and, when sufficient power is available, to transmit the stored signal representing the measured volume of the displaced conditioned fluid to a monitoring system; and an outlet portion defining an outlet opening in fluid communication with the flow measuring device and the outlet opening adapted to be connected to an outlet line and to allow the conditioned fluid that flows past the flow measuring device to exit the apparatus; the apparatus being sized to completely fit and operate from inside one of a plurality of standard or custom plumbing fixtures.

An embodiment of the present invention may include an apparatus measuring fluid flow in an individual fixture. The apparatus may include means for defining an inlet opening and adapted to be connected to and in fluid communication with a fluid inlet line; means for conditioning a first flow in fluid communication with and adapted to receive and condition a fluid flowing through the inlet opening means; means for measuring flow in fluid communication with the first flow conditioner and adapted to measure the conditioned fluid as the conditioned fluid flows past the flow measuring means and to generate a signal representing an amount of the conditioned fluid flowing past the flow measuring means; means for generating power in fluid communication with the first flow conditioner and adapted to generate and supply power; means to receive and store the generated power from the power generator and to store the signal representing the measured amount of the conditioned fluid received from the flow measuring device using the power from the power generating means or flow sensing device and, when sufficient power is available, to transmit the stored signal representing the measured volume of the displaced conditioned fluid to a monitoring system; and means for defining an outlet opening in fluid communication with the flow measuring means and the outlet opening adapted to be connected to an outlet line and to allow the conditioned fluid that flows past the flow measuring means to exit the apparatus; the apparatus being sized to completely fit and operate from inside one of a plurality of standard or custom plumbing fixtures.

Embodiments of the present invention include the systems, methods and modules substantially as shown and described.

The foregoing description has been provided for illustrative purposes. Variations and modifications to the embodiments described herein may become apparent to persons of ordinary skill in the art upon studying this disclosure, without departing from the spirit and scope of the present invention. The specific feature(s) illustrated herein in relation to specific embodiments can be used with any other embodiment described herein.

What is claimed is:

1. An apparatus comprising:
    an inlet portion defining an inlet opening and adapted to be connected to and in fluid communication with a fluid inlet line;
    a first flow conditioner in fluid communication with and adapted to receive and condition a fluid flowing through the inlet opening;
    a flow measuring device in fluid communication with the first flow conditioner and adapted to measure the conditioned fluid as the conditioned fluid flows past the flow measuring device and to generate a signal representing an amount of the conditioned fluid flowing past the flow measuring device;
    a power generator in fluid communication with the fluid inlet opening and to receive at least part of the fluid flowing through the inlet opening and to generate and supply power using the received at least part of the fluid flowing through the inlet opening;
    a pressure relief valve located upstream from the flow measuring device to receive at least another part of the fluid flowing through the inlet opening, the pressure relief valve to allow the at least another part of the fluid flowing through the inlet opening to bypass the power generator, if the pressure exerted by another part of the fluid flowing through the inlet opening exceeds a predetermined threshold at the pressure relief valve;
    an electronic component adapted to receive and store the generated power from the power generator and to store the signal representing the measured amount of the conditioned fluid received from the flow measuring device using the power from the power generator and, when sufficient power is available, to transmit the stored signal representing the measured volume of the displaced conditioned fluid to a monitoring system; and
    an outlet portion defining an outlet opening in fluid communication with the flow measuring device and the outlet opening adapted to be connected to an outlet line and to allow the conditioned fluid that flows past the flow measuring device to exit the apparatus;
    the apparatus being sized to completely fit and operate from inside one of a plurality of plumbing fixtures.

2. The apparatus of claim 1 further comprising:
    a second flow conditioner in fluid communication with and to receive the conditioned fluid from the flow measuring device and to condition the conditioned fluid.

3. The apparatus of claim 2 wherein the second flow conditioner is located upstream from the outlet opening.

4. The apparatus of claim 1 wherein the power generator is located before the flow measuring device and the at least part of the fluid flowing through the inlet opening received by the power generator flows from the power generator to and past the flow measuring device.

5. The apparatus of claim 1 wherein the pressure relief valve operates in parallel with the power generator.

6. The apparatus of claim 1 wherein the pressure relief valve is connected between an inlet channel to the power generator and an outlet channel from the power generator.

7. The apparatus of claim 1 further comprising a mechanism to detect fouling.

8. The apparatus of claim 7 wherein the mechanism to detect fouling comprises one of a differential pressure sensor and an optical sensor.

9. The apparatus of claim 1 wherein the predetermined threshold at the pressure relief valve is controlled by a biasing mechanism.

10. The apparatus of claim 1 wherein the electronic component is a signal processor and telemetry electronics component.

11. The apparatus of claim 10 wherein the signal processor and telemetry electronics component comprises:
    a telemetry antenna;
    a telemetry electronics component coupled to the telemetry antenna; and
    a signal processor to process the signal representing the amount of the conditioned fluid flowing past the flow measuring device and store flow information for the amount in the telemetry electronics component;
    when sufficient power is stored in the electronic component, the telemetry electronics component to transmit the flow information to a receiver/transmitter unit or a central collection point via the telemetry antenna.

12. The apparatus of claim 1 wherein the power generator comprises:
    an axel disposed perpendicular to a direction of flow of the at least part of the fluid flowing through the inlet opening;
    a fluid driver coaxially aligned and engaged with the axle, the fluid driver is disposed in a fluid chamber within the apparatus through which the at least part of the fluid flowing through the inlet opening flows; and a generator portion coaxially aligned and engaged with the axle, the generator portion disposed outside the fluid chamber, the generator portion to move in unison with the fluid driver in reaction to the at least part of the fluid flowing through the inlet opening flowing past the fluid driver to transmit the generated power to the electrical component.

13. The apparatus of claim 1 wherein the flow measuring device comprises:

a flow chamber coaxially disposed in the apparatus body between the first flow conditioner and a second flow conditioner and upstream from the outlet opening;

a flow measuring device assembly coaxially aligned with the flow measuring device chamber and a direction of flow of the fluid flowing through the inlet opening flows, the flow measuring device assembly including a central axis coaxially aligned with the flow measuring device chamber, an elongated central hub coaxially aligned with and attached to the central axis, and a plurality of flow measuring device blades; and a sensor element attached to an exterior wall of the flow measuring device chamber and connected to the electronic component, the sensor element to measure a number of rotations of components within the flow measuring device assembly and to transmit the number of rotations to the electronic component as a measure of the amount of fluid flow.

14. The apparatus of claim 13 wherein the sensor element is selected from the group comprising:

a magnetic sensor;

a variable reluctance sensor;

a piezoelectric sensor;

a magnetostrictive sensor; and a capacitive sensor.

15. The apparatus of claim 14 wherein the magnetic sensor comprises one of:

a Hall effect sensor;

a variable reluctance sensor; and a reed switch.

16. A plumbing fixture assembly comprising:

a water dispensing plumbing fixture for use in a dwelling unit, the water dispensing plumbing fixture being selected from the group consisting of a faucet, a shower head, a toilet, a dishwasher, a washing machine, and a refrigerator; and a wireless flow metering apparatus installed within the water dispensing plumbing fixture, the wireless flow metering apparatus including an inlet portion defining an inlet opening and adapted to be in fluid communication with a fluid inlet line;

a first flow conditioner in fluid communication with and adapted to receive and condition a fluid flowing through the inlet opening;

a flow measuring device in fluid communication with the first flow conditioner and adapted to measure the conditioned fluid as the conditioned fluid flows past the flow measuring device and to generate a signal representing an amount of the conditioned fluid flowing past the flow measuring device;

a second flow conditioner in fluid communication with and to receive the conditioned fluid from the flow measuring device and to condition the conditioned fluid;

a power generator in fluid communication with the fluid inlet opening and to receive at least part of the fluid flowing through the inlet opening and to generate and supply power using the at least part of the fluid flowing through the inlet opening;

an electronic component adapted to receive and store the power from the power generator and to store the signal representing the measured amount of the conditioned fluid received from the flow measuring device using the power from the power generator and, when sufficient power is available, to transmit the stored signal representing the measured amount of the conditioned fluid to a monitoring system; and an outlet portion defining an outlet opening and adapted to be connected to an outlet line, the outlet portion in fluid communication with the inlet portion and to allow the conditioned fluid that flows past the flow measuring device to exit the apparatus through the outlet opening.

17. The plumbing fixture assembly of claim 16 wherein the wireless flow metering apparatus is installed in the plumbing fixture downstream of a point at which hot and cold water are mixed in the plumbing fixture and upstream of the outlet portion.

18. The plumbing fixture assembly of claim 17 wherein the wireless flow metering apparatus is concealed within the plumbing fixture assembly.

19. The plumbing fixture assembly of claim 18 wherein the wireless flow metering apparatus is capable of operation at high and low-flow rates of water.

20. The plumbing fixture assembly of claim 18 wherein the wireless flow metering apparatus further comprises:

a pressure relief valve located upstream from the flow measuring device to receive at least another part of the fluid flowing through the inlet opening, the pressure relief valve to allow the at least another part of the fluid flowing through the inlet opening to bypass the power generator, if the pressure exerted by the at least another part of the fluid flowing through the inlet opening exceeds a predetermined threshold at the pressure relief valve.

21. A system comprising:

a fixture assembly including a water dispensing plumbing fixture for use in a dwelling unit, the water dispensing plumbing fixture being selected from the group consisting of a faucet, a shower head, a toilet, a dishwasher, a washing machine, and a refrigerator; and a wireless metering apparatus installed and concealed in the water dispensing plumbing fixture, the wireless metering apparatus having an inlet portion defining an inlet opening and adapted to be connected to and in fluid communication with a fluid inlet line;

a first flow conditioner in fluid communication with and adapted to receive and condition a fluid flowing through the inlet opening;

a flow measuring device in fluid communication with and adapted to measure the conditioned fluid as the conditioned fluid flows past the flow measuring device and to generate a signal representing an amount of the conditioned fluid flowing past the flow measuring device;

a second flow conditioner in fluid communication with and to receive the conditioned fluid from the flow measuring device and to condition the conditioned fluid;

a power generator in fluid communication with the inlet opening and to receive at least part of the fluid flowing through the inlet opening and to generate and supply power using the at least part of the fluid flowing through the inlet opening;

an electronic component adapted to receive the power from the power generator and to store the signal representing the measured amount of the conditioned fluid received from the flow measuring device using the power from the power generator and, when sufficient power is available, to transmit the stored signal representing the measured amount of the conditioned fluid to a monitoring system; and an outlet portion defining an outlet opening and adapted to be connected to an outlet line, the outlet portion in fluid communication with the inlet portion and to allow the conditioned fluid that flows past the flow measuring device to exit the apparatus through the outlet opening;

a local receiver/transmitter component to receive transmissions from the fixture assembly containing information on the amount of fluid flowing through the fixture assembly and to forward the transmissions;

a hub to receive the forwarded transmissions of the information on the amount of fluid flowing through the plumbing fixture from the local receiver/transmitter, to process the information, and to transmit the processed information for billing; and a processing system programmed to receive the processed information on the amount of fluid flowing through the plumbing fixture, determine a cost associated with the amount of fluid flowing through the plumbing fixture, allocate the cost to an account, and bill an owner of the account for the cost.

22. The system of claim 21 wherein the local receiver/transmitter is accessible to review the information sent from the fixture assembly.

23. The system of claim 21 wherein the hub is accessible to review the processed information on the amount of fluid flowing through the fixture assembly.

24. The system of claim 21 further comprising a mechanism to detect fouling.

25. The system of claim 24 wherein the mechanism to detect fouling comprises one of a differential pressure sensor and an optical sensor.

26. An apparatus comprising:
an inlet portion defining an inlet opening and adapted to be connected to and in fluid communication with a fluid inlet line;
a first flow conditioner in fluid communication with and adapted to receive and condition a fluid flowing though the inlet opening;
a flow measuring device in fluid communication with the first flow conditioner and adapted to measure the conditioned fluid as the conditioned fluid flows past the flow measuring device and to generate a signal representing an amount of the conditioned fluid flowing past the flow measuring device;
a power generator in fluid communication with the first flow conditioner and adapted to generate and supply power;
an electronic component adapted to receive and store the generated power from the power generator and to store the signal representing the measured amount of the conditioned fluid received from the flow measuring device using the power from the power generator and, when sufficient power is available, to transmit the stored signal representing the measured amount of the conditioned fluid to a monitoring system; and
an outlet portion defining an outlet opening in fluid communication with the flow measuring device and the outlet opening adapted to be connected to an outlet line and to allow the conditioned fluid that flows past the flow measuring device to exit the apparatus;
the apparatus being sized to completely fit and operate from inside one of a plurality of water dispensing plumbing fixtures for use in a dwelling unit, the water dispensing plumbing fixture being selected from the group consisting of a faucet, a shower head, a toilet, a dishwasher, a washing machine, and a refrigerator.

27. The apparatus of claim 26 further comprising:
a second flow conditioner in fluid communication with and to receive the conditioned fluid from the flow measuring device and to condition the conditioned fluid.

28. The apparatus of claim 27 wherein the second flow conditioner is located upstream from the outlet opening.

29. The apparatus of claim 26 further comprising a mechanism to detect fouling.

30. The apparatus of claim 29 wherein the mechanism to detect fouling comprises one of a differential pressure sensor and an optical sensor.

31. The apparatus of claim 26 wherein the electronic component is a signal processor and telemetry electronics component.

32. The apparatus of claim 31 wherein the signal processor and telemetry electronics component comprises:
a telemetry antenna;
a telemetry electronics component coupled to the telemetry antenna; and
a signal processor to process the signal representing the amount of the conditioned fluid flowing past the flow measuring device and store flow information for the amount in the telemetry electronics component;
when sufficient power is stored in the electronic component, the telemetry electronics component to transmit the flow information to a receiver/transmitter unit or a central collection point via the telemetry antenna.

33. The apparatus of claim 26 wherein the flow measuring device comprises:
a flow chamber coaxially disposed in the apparatus body between the first flow conditioner and a second flow conditioner and upstream from the outlet opening;
a flow measuring device assembly coaxially aligned with the flow measuring device chamber and a direction of flow of the fluid flowing through the inlet opening flows, the flow measuring device assembly including a central axis coaxially aligned with the flow measuring device chamber, an elongated central hub coaxially aligned with and attached to the central axis, and a plurality of flow measuring device blades; and
a sensor element attached to an exterior wall of the flow measuring device chamber and connected to the electronic component, the sensor element to measure a number of rotations of components within the flow measuring device assembly and to transmit the number of rotations to the electronic component as a measure of the amount of fluid flow.

34. The apparatus of claim 33 wherein the sensor element is selected from the group comprising:
a magnetic sensor;
a variable reluctance sensor;
a piezoelectric sensor;
a magnetostrictive sensor; and
a capacitive sensor.

35. The apparatus of claim 34 wherein the magnetic sensor comprises one of:
a Hall effect sensor;
a variable reluctance sensor; and
a reed switch.

36. The apparatus of claim 33 wherein the power generator comprises:
at least one power generating device disposed in a wall that defines the flow chamber of the flow measuring device to generate an electric current when at least one of the plurality of flow measuring device blades rotates past the at least one power generating device as a result of fluid flowing past the plurality of flow measuring device blades.

37. The apparatus of claim 36 wherein the at least one power generating device is selected from the group comprising:
a magnetostrictive material; and
a piezoelectric material.

38. The apparatus of claim 37 wherein the at least one power generating sensor is adapted to measure a number of rotations of components within the flow measuring device assembly and to transmit the number of rotations to the electronic component as a measure of the amount of fluid flow.

* * * * *

UNITED STATES PATENT AND TRADEMARK OFFICE
CERTIFICATE OF CORRECTION

PATENT NO. : 7,508,318 B2 Page 1 of 1
APPLICATION NO. : 11/399395
DATED : March 24, 2009
INVENTOR(S) : Michael H. Casella et al.

It is certified that error appears in the above-identified patent and that said Letters Patent is hereby corrected as shown below:

Column 18 – Line 63, replace "axel" with --axle--.

Column 19 – Line 8, replace "electrical" with --electronic--.

Signed and Sealed this

Thirtieth Day of June, 2009

JOHN DOLL
*Acting Director of the United States Patent and Trademark Office*